US012789681B2

(12) United States Patent
Chewter et al.

(10) Patent No.: US 12,789,681 B2
(45) Date of Patent: Nov. 10, 2026

(54) METHOD TO CONTROL THERMAL SENSATION ACCORDING TO OCCUPANCY OF SEATS

(71) Applicant: GENTHERM INCORPORATED, Novi, MI (US)

(72) Inventors: Alan Chewter, Ypsilanti, MI (US); Satya Mandali, West Bloomfield, MI (US); Mobashar Ahmad, Troy, MI (US); Ankit Tiwari, Farmington Hills, MI (US); Tyler Myers, Plymouth, MI (US); Chad Westerman, Milford, MI (US)

(73) Assignee: GENTHERM INCORPORATED, Novi, MI (US)

( * ) Notice: Subject to any disclaimer, the term of this patent is extended or adjusted under 35 U.S.C. 154(b) by 426 days.

(21) Appl. No.: 18/561,933

(22) PCT Filed: May 3, 2022

(86) PCT No.: PCT/US2022/027421
§ 371 (c)(1),
(2) Date: Nov. 17, 2023

(87) PCT Pub. No.: WO2022/250883
PCT Pub. Date: Dec. 1, 2022

(65) Prior Publication Data

US 2024/0140284 A1 May 2, 2024

Related U.S. Application Data

(60) Provisional application No. 63/194,257, filed on May 28, 2021.

(51) Int. Cl.
*B60N 2/56* (2006.01)
*B60H 1/00* (2006.01)
(Continued)

(52) U.S. Cl.
CPC ....... *B60N 2/5642* (2013.01); *B60H 1/00878* (2013.01); *B60N 2/002* (2013.01);
(Continued)

(58) Field of Classification Search
CPC .................... B60N 2/56–5692; B60N 2/02246
See application file for complete search history.

(56) References Cited

U.S. PATENT DOCUMENTS

| | | | |
|---|---|---|---|
| 5,894,207 | A | 4/1999 | Goings |
| 2002/0047675 | A1 | 4/2002 | Hein |

(Continued)

FOREIGN PATENT DOCUMENTS

| | | | |
|---|---|---|---|
| WO | 2017184779 | A1 | 10/2017 |
| WO | 2020108856 | A1 | 6/2020 |
| WO | 2020172249 | A1 | 8/2020 |

OTHER PUBLICATIONS

International Search Report and Written Opinion for International Application No. PCT/US2022/027421 mailed Jul. 12, 2022.

(Continued)

*Primary Examiner* — Syed A Islam
(74) *Attorney, Agent, or Firm* — Carlson, Gaskey & Olds, P.C.

(57) ABSTRACT

A microclimate system for a vehicle occupant includes a seat that is configured to provide an interface between an occupant and a seating surface, an actuator that is configured to adjust a seat positioning that characterizes the interface, at least one microclimate thermal effector that is in thermal communication with the seat at the interface, and a controller that is in communication with the microclimate thermal effector. The controller is configured to regulate the microclimate thermal effector based upon the interface.

21 Claims, 7 Drawing Sheets

(51) Int. Cl.
*B60N 2/00* (2006.01)
*B60N 2/02* (2006.01)

(52) U.S. Cl.
CPC ....... *B60N 2/0025* (2023.08); *B60N 2/02246* (2023.08); *B60N 2/5692* (2013.01); *B60N 2210/40* (2023.08)

(56) References Cited

U.S. PATENT DOCUMENTS

| | | | | |
|---|---|---|---|---|
| 2018/0244175 | A1* | 8/2018 | Tan | B60K 35/22 |
| 2021/0008960 | A1 | 1/2021 | Saitou et al. | |
| 2021/0016686 | A1* | 1/2021 | Yetukuri | B60N 2/5621 |
| 2022/0055508 | A1* | 2/2022 | Lee | B60N 2/0272 |

OTHER PUBLICATIONS

International Preliminary Report on Patentability for International Application No. PCT/US2022/027421 mailed May 31, 2023.

* cited by examiner

METHOD TO CONTROL THERMAL SENSATION ACCORDING TO OCCUPANCY OF SEATS

CROSS-REFERENCE TO RELATED APPLICATION

This application claims priority to United States Provisional Patent Application No. 63/194,257 filed on May 28, 2021.

TECHNICAL FIELD

This disclosure relates to a microclimate system that provides increased thermal comfort to a vehicle occupant via a seat.

BACKGROUND

Within a vehicle cabin, occupant comfort can be controlled using a range of thermal devices to control the environment local to the occupant (microclimate) and some may affect the total cabin environment (macroclimate). These devices transfer heat to or from the occupant to achieve the desired level of personal thermal comfort, according to occupant preference and local environmental conditions. A cooling device transfers heat away from the body, a heating device transfers heat to the body. Some thermal devices can provide either heating or cooling. Thermal devices may transfer heat by radiation, conduction or convection, or a combination of these methods.

A vehicle seat may have convective and/or conductive heat transfer microclimate devices, or thermal effectors. It is desirable to control these devices so as to efficiently and effective provide thermal comfort to the occupant.

SUMMARY

In one exemplary embodiment, a microclimate system for a vehicle occupant includes a seat that is configured to provide an interface between an occupant and a seating surface, an actuator that is configured to adjust a seat positioning that characterizes the interface, at least one microclimate thermal effector that is in thermal communication with the seat at the interface, and a controller that is in communication with the at least one microclimate thermal effector. The controller is configured to regulate the at least one microclimate thermal effector based upon the interface.

In a further embodiment of any of the above, the controller is configured to regulate the at least one microclimate thermal effector using a transfer function based upon effects of the occupant on the interface.

In a further embodiment of any of the above, the seating surface is provided by at least one of a seat cushion and a seat back. The actuator is configured to adjust for effects on the interface that is provided by at least one of a seat cushion location, a seat back location and a seat lumbar orientation.

In a further embodiment of any of the above, the seat cushion location and seat back location each include at least one of seating surface height and seating surface angle and the seat lumbar orientation includes at least one of lumbar support position and size.

In a further embodiment of any of the above, the microclimate system includes a seat position input, and the controller includes a first memory that has a stored seat position and a second memory has stored occupant thermal conditioning preferences for the transfer function of the at least one microclimate thermal effectors in the stored seat position.

In a further embodiment of any of the above, the controller has a third memory that has occupant information that relates to the interface. The occupant information includes at least one of occupant height, occupant weight and occupant gender.

In a further embodiment of any of the above, the seat includes an occupant sensor.

In a further embodiment of any of the above, the occupant sensor is an occupant weight sensor.

In a further embodiment of any of the above, the controller is configured to adjust the transfer function based upon an occupant seating status.

In a further embodiment of any of the above, the transfer function includes characteristics that relate to seat material thickness and seating surface area.

In a further embodiment of any of the above, the transfer function includes characteristics that relate to seat thermal conductivity and seat heat transfer rate.

In a further embodiment of any of the above, the at least one microclimate thermal effector includes at least one of a thermoelectric device, a blower, and a heating mat.

In another exemplary embodiment, a method for optimizing thermal operations in a microclimate system includes determining whether a seat is occupied by an occupant, determining a seat positioning of the seat, and controlling a microclimate thermal effector based upon the seat occupied determining step and the seat positioning determining step to provide thermal comfort to an occupant of the seat.

In a further embodiment of any of the above, the method includes adjusting a transfer function to account for pressure that is exerted on seating surfaces of the seat by the occupant based upon the seat occupied determining step and the seat positioning determining step.

In a further embodiment of any of the above, the seat positioning includes at least one of a seat cushion location, a seat back location and a seat lumbar orientation.

In a further embodiment of any of the above, the seat cushion location and seat back location each include at least one of seating surface height and seating surface angle.

In a further embodiment of any of the above, the seat lumbar orientation includes at least one of lumbar support position and size.

In a further embodiment of any of the above, the method includes referencing a seat position memory, and the controlling step is performed based upon stored occupant thermal control settings for the occupant associated with the seat position memory.

In a further embodiment of any of the above, the method includes preconditioning the seat based upon an adjusted transfer function for the occupant when the seat is unoccupied to achieve a desired occupant thermal comfort.

In a further embodiment of any of the above, the method includes revising the stored occupant thermal control settings based upon inputs from the occupant.

In a further embodiment of any of the above, the method includes preconditioning the seat when unoccupied based upon an adjusted transfer function for the occupant when unknown to achieve a desired occupant thermal comfort for the unknown occupant. The seat is a passenger seat.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure relates to a microclimate system that provides increased thermal comfort to the occupant by controlling microclimate thermal effectors to generate a desired comfort level.

Figure 1:
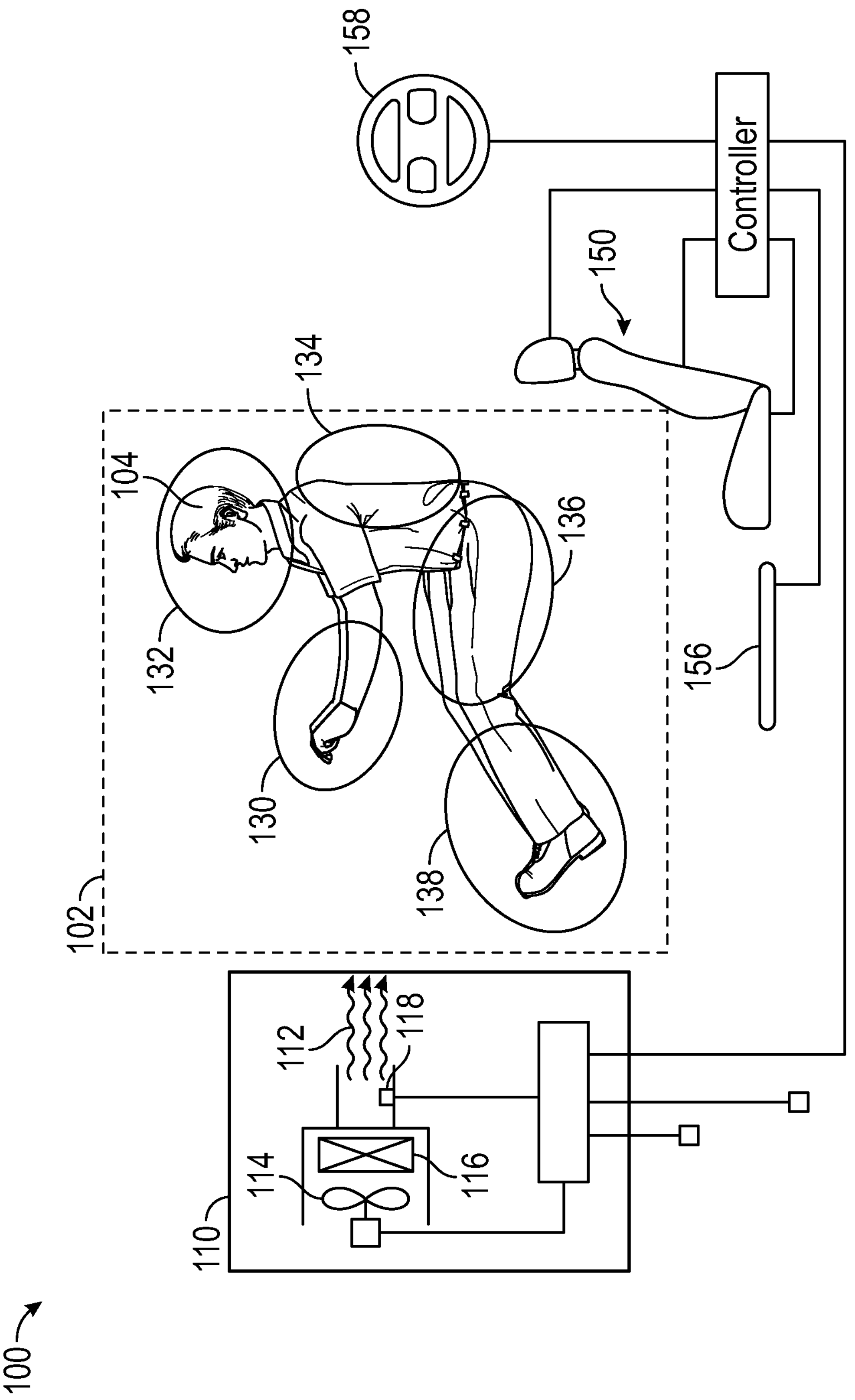
FIG. 1 schematically illustrates a vehicle heating ventilation and cooling microclimate system.

Referring to FIG. 1, a vehicle 100 has a heating, ventilation and air conditioning (HVAC) system 110 that is used to condition the air 112 and control the bulk temperature of the air within the vehicle cabin 102. A typical HVAC system 110 has ducting that supplies conditioned air 112 to the cabin 102 using a blower 114 moving air over a heat exchanger 116. A sensor 118 monitors the temperature of the conditioned cabin air 112, and a controller regulates operation of the HVAC system 110 to a temperature set point that is typically manually adjusted by an occupant 104. The central HVAC system 110 is insufficient to achieve thermal comfort for each specific occupant 104 and location in many scenarios, such as those where multiple different occupants 104 are in the same cabin 102, so microclimate devices or thermal effectors are used to create a unique microclimate for each occupant 104 in the cabin 102, thereby providing improved overall thermal comfort for each occupant 104.

As a further challenge to providing an effective climate control system, each occupant 104 typically has unique personal comfort preferences. That is, a particular occupant 104 detects a level of thermal energy differently than another occupant 104. As a result, the exact same thermal environment within a vehicle 100 may be perceived as comfortable by one occupant 104, but as uncomfortable by another occupant 104.

Microclimate thermal effectors are localized components that can adjust or maintain a desired microclimate in a corresponding zone 130, 132, 134, 136, 138. The microclimate thermal effectors can include, for example, climate controlled seats 150 (e.g., U.S. Pat. Nos. 5,524,439 and 6,857,697), a head rest/neck conditioner (e.g., U.S. Provisional App. No. 62/039,125), a climate controlled headliner (e.g., U.S. Provisional App. No. 61/900334), a steering wheel 158 (e.g., U.S. Pat. No. 6,727,467 and U.S. Pub. No. 2014/0090513), a heated gear shifter (e.g., U.S. Pub. No. 2013/0061603, etc.), heater mats 156, a mini-compressor system, and/or any other systems configured to achieve a personalized microclimate. The enumerated microclimate thermal effectors are exemplary in nature and are non-limiting. The microclimate system provides a corresponding occupant 104 personal comfort in an automated manner with little or no input from the corresponding occupant 104. All or some of the microclimate thermal effectors can be arranged to optimally control the thermal environment around an occupant of a seat located anywhere inside a passenger vehicle. In addition, the microclimate thermal effectors can be used to regulate thermal comfort separately for individual segments of the occupant's body.

In the example of FIG. 1, the occupant comfort is controlled using the range of thermal effectors. The thermal effectors transfer heat to (heating) or from (cooling) the occupant to achieve a desired level of personal thermal comfort, according to occupant preference and local environmental conditions. Some thermal effectors are capable of providing both the heating and cooling functions, and the different thermal effectors achieve their heating and cooling operations using different methodologies including, but not limited to, radiation, conduction or convection, or a combination of these. Further, some of the thermal effectors are able to impact the entire vehicle cabin, while others will have a localized impact limited to the occupant, or a portion of the occupant, in the immediate vicinity of the thermal effector.

Thermal effectors (e.g., thermoelectric device (TED), a blower, and a heating mat) contained within an occupant seat 150 may have heat characteristics that depend on the installation in the seat. By way of example, conductive devices may transfer heat through a layer of insulating material such as foam, fabric, or leather trim with the amount and types of these materials controlling the effectiveness of the thermal effector. Similarly, convective devices may push or pull conditioned air through vented layers of a seat suspension system.

Even further, when thermal devices are configured to affect a seat occupant in a dependent fashion (i.e. the effectiveness of one thermal effector depends on the operations of another thermal effector), the thermal calculations and device controls are most effective if they account for those dependencies. The control algorithm described herein (which includes an estimator and a controller) simultaneously solves three problems. First, the controller determines how to most effectively split the control signal between the dependent devices. Second, the estimator determines the magnitude of effect of one device on the other. Third, to control the overall system, the estimator determines the combined effect on the occupant of several devices so that the controller can ensure that the overall system objectives are met. The combined effect necessarily includes the impact each thermal effector has on the heat transfer rates and thermal effectiveness of nearby thermal effectors.

The HVAC system 110 of FIG. 1 uses a control algorithm including thermodynamic models of the heat transfer from the thermal effectors to their environment and then combines these calculated heat transfer rate quantities with a seat level model to determine the combined heat transfer rate to the occupant of the seat. The control algorithm accounts for the dependencies effecting thermal device control and thermal state modeling using nested transfer functions. The nested transfer functions refers to the utilization of component transfer functions to model operations of each thermal effector, and a system level transfer function to model system operations including the output of each of the component transfer functions. By doing so, the algorithm improves the control effectiveness and efficiency. However, it should be understood that nested transfer functions need not be used to practice the disclosed system. While applied to thermal devices within a seat thermal control sub-system herein, the concepts described can be applied to any scenario where multiple thermal devices are combined to drive thermal change in a single system.

Figure 2:
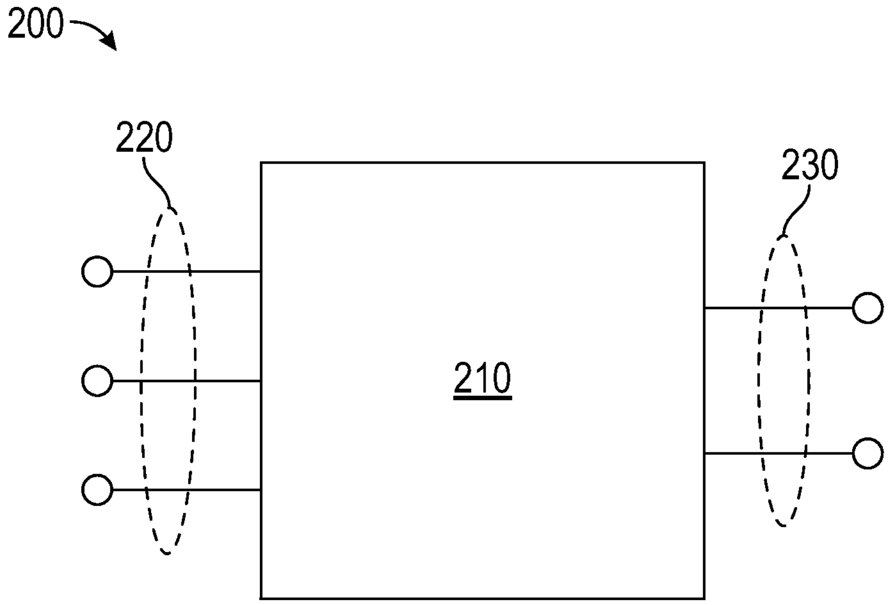
FIG. 2 schematically illustrates an example thermal effector transfer function.

With continued reference to FIG. 1, each of the thermal effectors is modeled individually using a transfer function 210 that represents how the thermal effector physically operates. A schematic example of this is included at FIG. 2. The transfer function 210 is a real time calculation that uses variables and/or inputs 220 to determine a current thermal state of the system 200 being modeled. The inputs 220 correspond to real time measured parameters of the thermal effector, as well as inputs indicative of the environment in which the thermal effector is positioned and the configuration data of the thermal effector. The inputs are provided to a thermodynamic or physics model within the transfer function 210 and the transfer function 210 converts the data into a set of outputs 230 that represent the current thermal state of the thermal effector. The outputs provide feedback to the controller driving the thermal effector. In a conventional system, the outputs 230 of the transfer function 210 are used to drive the physical system of the thermal effector in a feedback loop.

Within the context of FIG. 1, the overall seat system can be thermodynamically characterized in a similar way as each thermal effector, with the transfer functions of each thermal effector being nested within a transfer function of the seat. The seat system takes inputs from outside the subsystem (e.g., exterior temperature, seat occupancy, etc.) as well as the outputs from nested transfer functions (alternatively referred to as component transfer functions). The seat system provides a transfer function including a model of the impact that each thermal effector has on the other thermal effectors in the system.

Figure 3:
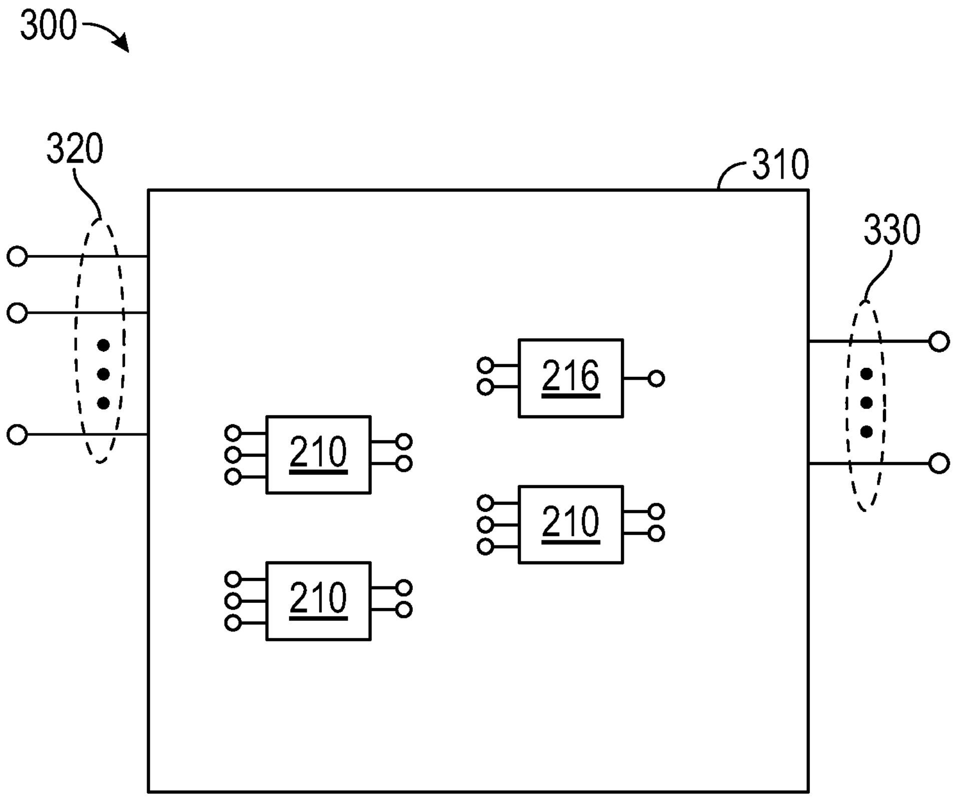
FIG. 3 schematically illustrates a vehicle system transfer function including multiple thermal effectors.

The architectural design approach of using nested subsystem models built from component transfer functions allows for an efficient re-use of software defining the component transfer functions and is illustrated in FIG. 3. The top-level transfer function 310 of the seat system identifies the heat transfer rates and temperatures at a contact with the seat occupant, and allows for the impact of each component transfer function 210 on each other component transfer function 210 to be considered within the system transfer function 310.

Figure 4:
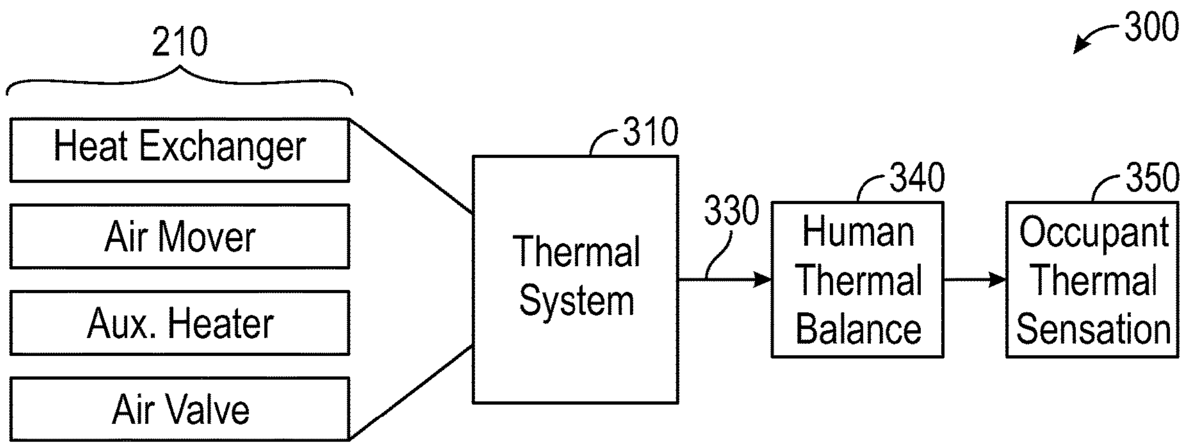
FIG. 4 schematically illustrates an alternative representation of the vehicle system of FIG. 3.

FIG. 4 provides an alternate illustration of the system 310 applied to a convective thermal air system 300. The convective thermal air system 300 includes multiple component transfer functions 210 defining the operations of a heat exchanger, an air mover (e.g. a fan), an auxiliary air heater, and an air valve. Alternative systems include alternative components, but are arranged in a similar structure and operate in a similar fashion. Each of the component transfer functions 210 provides outputs to the thermal system transfer function 310. The thermal system transfer function 310 which generates an output 330 based upon inputs 320 and that is capable of driving human thermal balance 340, and ultimately occupant thermal sensation 350. The utilization of the component transfer functions 210 within the overall thermal system transfer function 310 allows the algorithm to account for the impact that each component transfer function 210 has on each other component transfer function 210.

Figure 5:
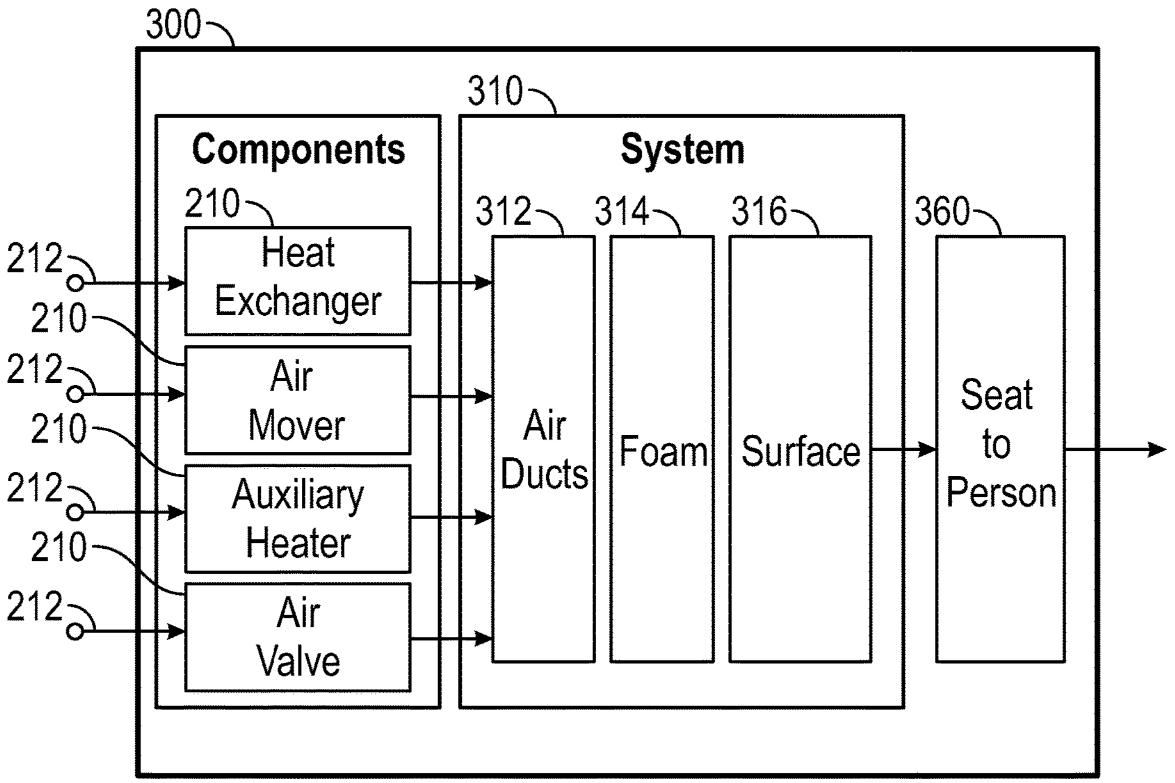
FIG. 5 schematically illustrates a more detailed representation of the vehicle system transfer function operations of FIG. 3.
Figure 6:
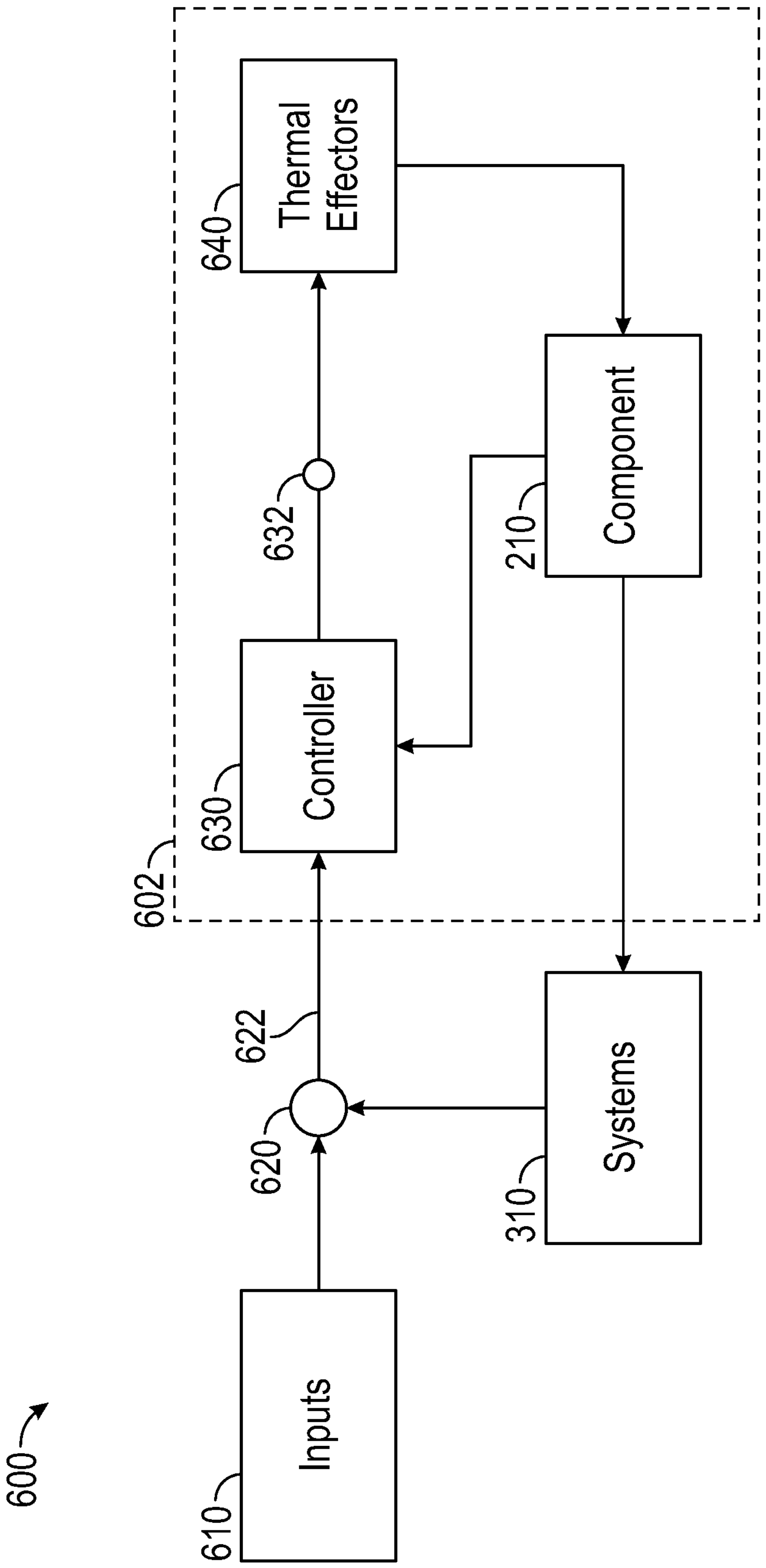
FIG. 6 schematically illustrates a control architecture for controlling the vehicle system transfer function of FIGS. 3.

FIG. 5 further expands the example of FIG. 4 including a more detailed representation of the system level transfer function 310 according to a specific example. As described above, the component transfer functions 210 are a set of transfer functions, each of which receives one or more measurements 212 corresponding to the specific component (e.g., heat exchanger, air mover, auxiliary heater, air valve, etc.) being modeled by the transfer function 210. The thermodynamic model of the seat determines the heat flux and temperature at contact with the seat occupant. This model may include component models for thermal devices, blower, cushions, frame, air paths etc. The component transfer functions 210 provide outputs to the system transfer function 310. The system transfer function 310 includes portions that define the impact of air ducts 312, seating foam 314, and the seating surface material 316, as examples. In alternative implementations the portions can include other system factors depending on the factors impacting the given system. The calculations are run in real time, so that the current estimate of heat transfer rates and temperatures at the seat to person interface 360 can be adjusted to match the real time conditions. The transfer function 310 provides state estimates for the control of the individual devices within the system (the thermal effector transfer functions 210) as well as for the system 300 itself.

With continued reference to FIGS. 1-5, FIG. 6 schematically illustrates a control system 600 for controlling thermal effectors within a vehicle seat. Initially, inputs 610 are provided to a controller including the control system 600. The inputs 610 correspond to occupant setpoints (e.g. temperatures or comfort levels) and can be generated either directly by an occupant of the seat, or automatically via a general vehicle controller based on whether the seat is occupied or not and on whether the occupant has a known comfort profile. The inputs 610 are, in some examples, weighted according to the weighting process described below with regards to FIGS. 8-12. In other examples, the inputs 610 can be provided with static weighting that is predefined by the controller.

The inputs 610 are compared to the output of the system transfer function 310 via a comparison 620 to generate an error value 622. The error value 622 represents the difference between the commanded values (the inputs) and the actual system values (the output of the system transfer function 310). The error value 622 includes multiple signals, each of which is provided to a corresponding thermal effector system 602 including a thermal effector controller 630 that converts the error value into physical control signals 632 that drive the thermal effectors 640 to operate. One or more sensors throughout the thermal system, and in particular at the thermal effectors 640, measures the conditions at each of the thermal effectors 640, and provides the measured values to the component transfer functions 210 corresponding to that thermal effector 640. The component transfer function 210 then provides outputs to the system transfer function 310, in which it is nested, and to the controller 630 controlling the thermal effector 640.

The thermal effector system 602 is repeated for each individual thermal effector system within the microclimate system. In some examples the controller 630 is a dedicated controller for the corresponding thermal effector 640, while in other examples the controller 630 is a subcomponent of a microclimate system controller or general vehicle controller with the subcomponent being dedicated to control of the corresponding thermal effector 640.

Automotive seats often use electronics to control seat position, inclination and lumbar support. These systems typically keep track of the current and user desired seat positions. Current systems do not control thermal comfort according to heat transfer within devices, seats or the vehicle cabin. Consequently, current systems are unable to adjust for heat transfer within the seat by controlling according to effects of seat memory recall, seat position, cushion pressure or occupancy of each individual seat in the vehicle. The system of this disclosure applies corrections to the models of the thermal devices and the seat sub-system to account for seat occupancy and seat positioning (e.g., surface inclination effects) on heat transfer. The result is that the control system provides uniform thermal sensation control regardless of seat occupancy or seat positioning.

Figure 7:
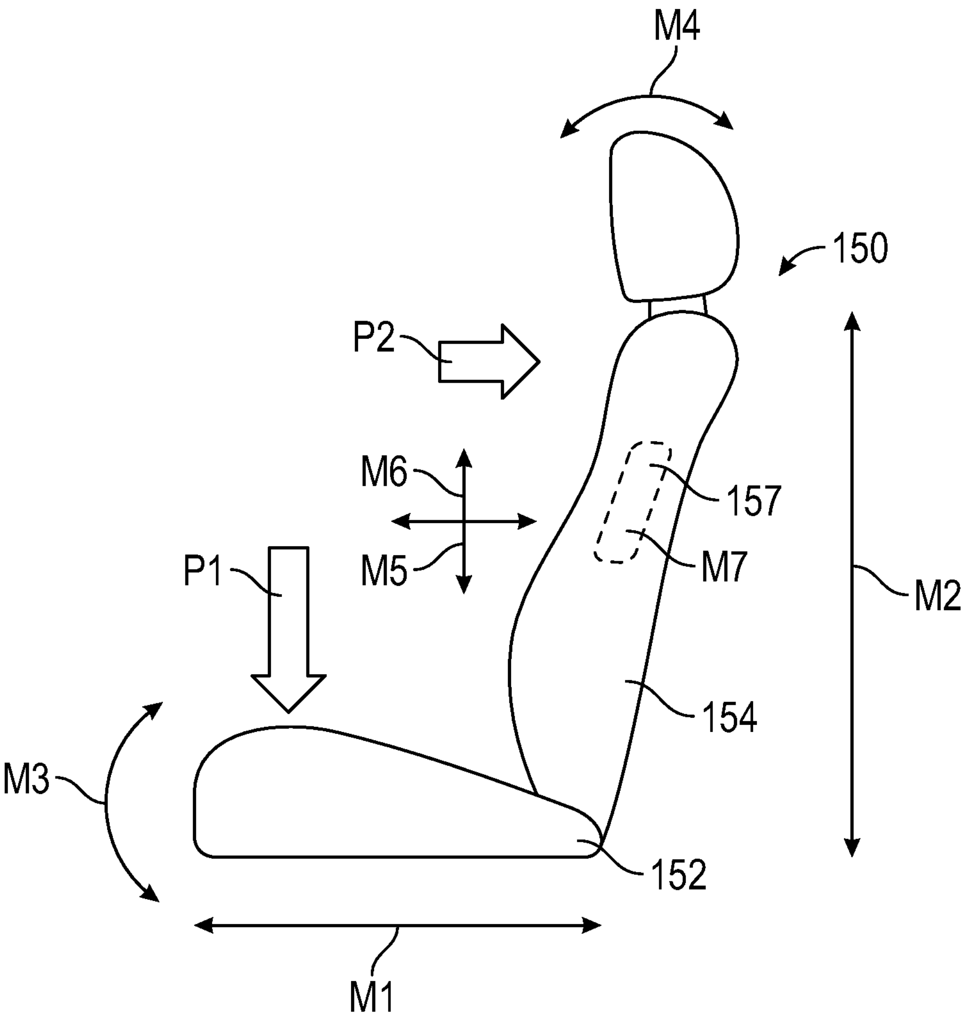
FIG. 7 is a schematic of an adjustable vehicle seat having at least one microclimate device.

Referring to FIG. 7, the seat 150 includes a seating surface provided by at least one of a seat cushion 152 and a seat back 154. The seat back 154 may include one or more adjustable lumbar supports 157. Actuators, such as motors M1 -M7, are configured to adjust at least one of a seat cushion location, a seat back location and a seat lumbar orientation, which affect seating surface height, seating surface angle, lumbar support position and size. A seated occupant applies pressures P1, P2 respectively on the seating surfaces at an interface for a given seat positioning. Those pressures and their effects on the seat heat transfer characteristics are dependent upon the seat position, construction of the seat (e.g., seat material thickness and seating surface area), and occupant characteristics (e.g., occupant height, occupant weight and occupant gender).

Thermal devices placed within the occupant seat may have heat transfer characteristics that depend on their installation in the seat. In particular, conductive devices may transfer heat through a layer of insulating materials such as foam, fabric or leather trim, while convective devices may push or pull conditioned air through vented layers of the seat suspension system. In each case, the bulk heat transfer can be characterised by specific thermal resistance terms which may vary in magnitude depending on pressure applied to the seat by the occupant. Further, the pressure applied to the seat will be different for the seat base cushion compared to the seat back cushion due to the geometry of the seat and the slope of seat surfaces.

The seat positioning may be stored in memory for a given occupant and then recalled by selecting the stored seat position using a switch, touch screen or other input device. In one example, when a user recalls a memory position, e.g., seat position 1, the climate controls can use this information to adjust the seat controls including user preference information accumulated over time in that same memory position.

The seat 150 may include an occupant sensor that can determine whether the seat is unoccupied or whether an occupant is present. If a weight sensor is used, it may be possible to determine the occupant's weight.

The transfer functions for the seat system and associated components is represented by the two equations below, where $q_{cv}$ is convective heat transfer, $q_{cd}$ is conductive heat transfer, $h_v$ is heat transfer rate, T is the surface temperature, $T_f$ (is the outlet air temperature from a TED or similar convective heating/cooling device, dT is T-$T_{cond}$ (where $T_{cond}$ is the temperature of the heater mat or conductive device), $k_d$ is thermal conductivity of the seating surface, s is material thickness between the surface and the heater mat or conductive device, and A is area of the seating surface.

$$q_{cv} = h_v A(T - T_f)$$

-continued $$q_{cd} = \left(\frac{k_d}{s}\right)A(dT)$$

These terms are modified according to the effect of seat occupancy status and seat positioning, such as seat cushion location and seat back location (e.g., seating surface height and seating surface angle) and seat lumbar orientation. The calculations run in real time so that adjustments are used in the current estimation of heat transfer rate and temperature at the seat to occupant interface.

These transfer functions account for the effects of the changing thermal transfer characteristic resulting from different pressures applied to the seat based upon different occupants and different seat positioning. A memory may be used to store occupant thermal conditioning preferences for the thermal transfer function of the at least one microclimate thermal effectors in the stored seat position. Thus, recalling the seat position can be used to automatically thermally condition the seat for the occupant associated with that stored seat position.

Figure 8:
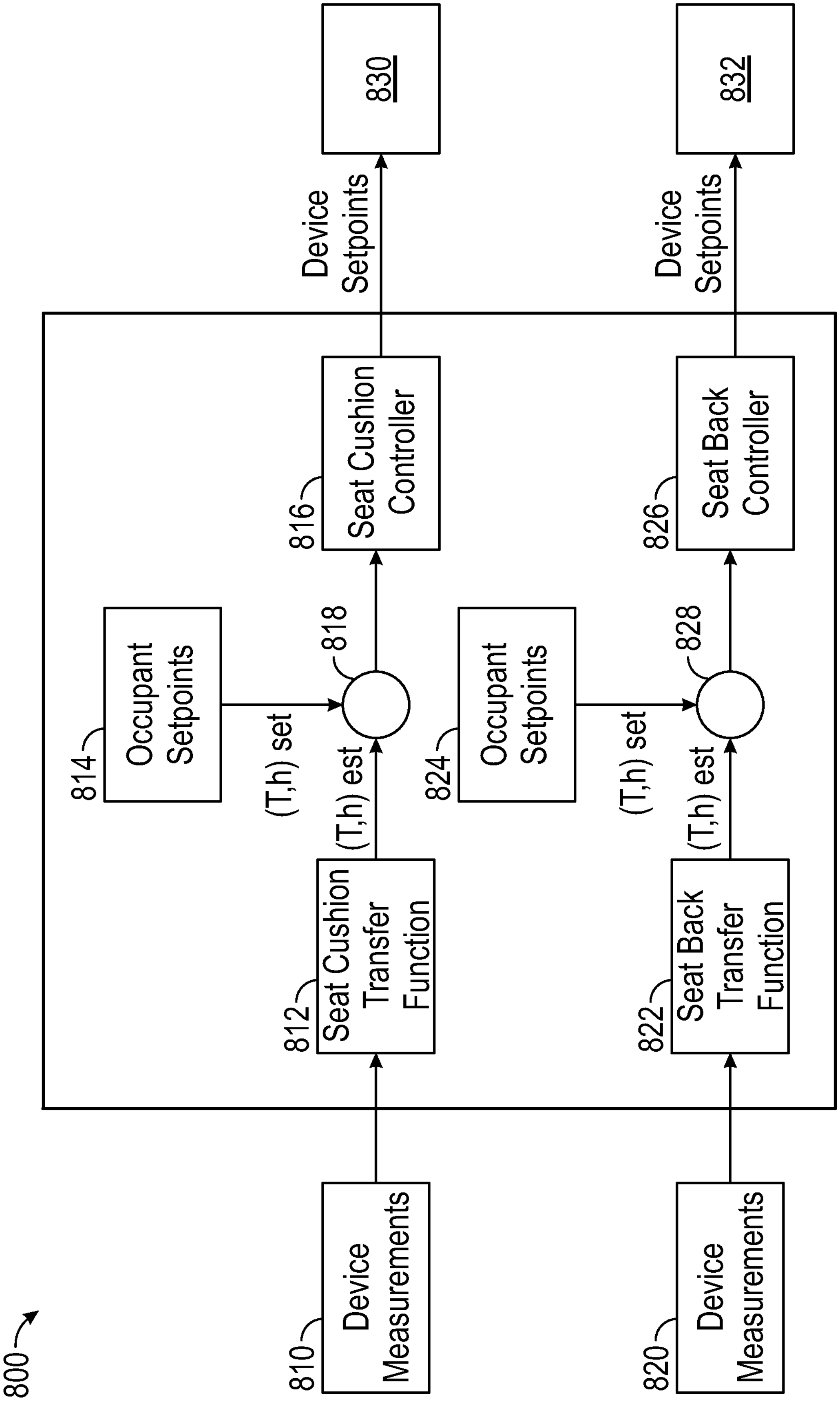
FIG. 8 schematically illustrates an architecture for thermal controls for the seat shown in FIG. 7.

The control system is designed so that the controller is tolerant of seat occupancy status, as depicted in FIG. 8. The transfer functions 812, 822 for seat cushion and seat back are calculated as described above, with knowledge of occupancy status, seat positioning, etc. (device measurements 810, 820) and pass the adjusted state variables including calculated (818, 828) temperature (T) and heat transfer rate (h) at the interface between the seat and the occupant (or open space if not occupied), to the controller (816, 826) continuously. These calculations 818, 828 are adjusted based upon further inputs 814, 824 by the occupant. The controller 816, 826 adjusts its control outputs 830, 832 to the thermal devices as necessary based on the corrected input data.

In another example, the disclosed system allows the same control scheme to operate during preconditioning as is used in normal operation. Pre-conditioning refers to the control of thermal devices installed in a vehicle to bring the occupant environment to a preferred thermal condition before the vehicle is operated. Different modes of preconditioning are available to account for the state of available power, e.g. if an electric vehicle is connected to an off-board power supply whose use doesn't impact the driving range of the vehicle. During pre-conditioning unoccupied seats use the adjusted transfer function to account for the changes in thermal characteristics of seat. The controller is therefore able to achieve the desired set temperature regardless weather the seat is occupied or not. The benefits of this approach include improving the efficiency of pre-conditioning modes while maintaining consistent time to sensation.

In yet another example, the thermal state of seats can be controlled differently according to occupant status. For example, the control system can be used in a taxi to maintain the driver's seat at a desired thermal state, while preparing an unoccupied passenger seat for an expected rider.

Figure 9:
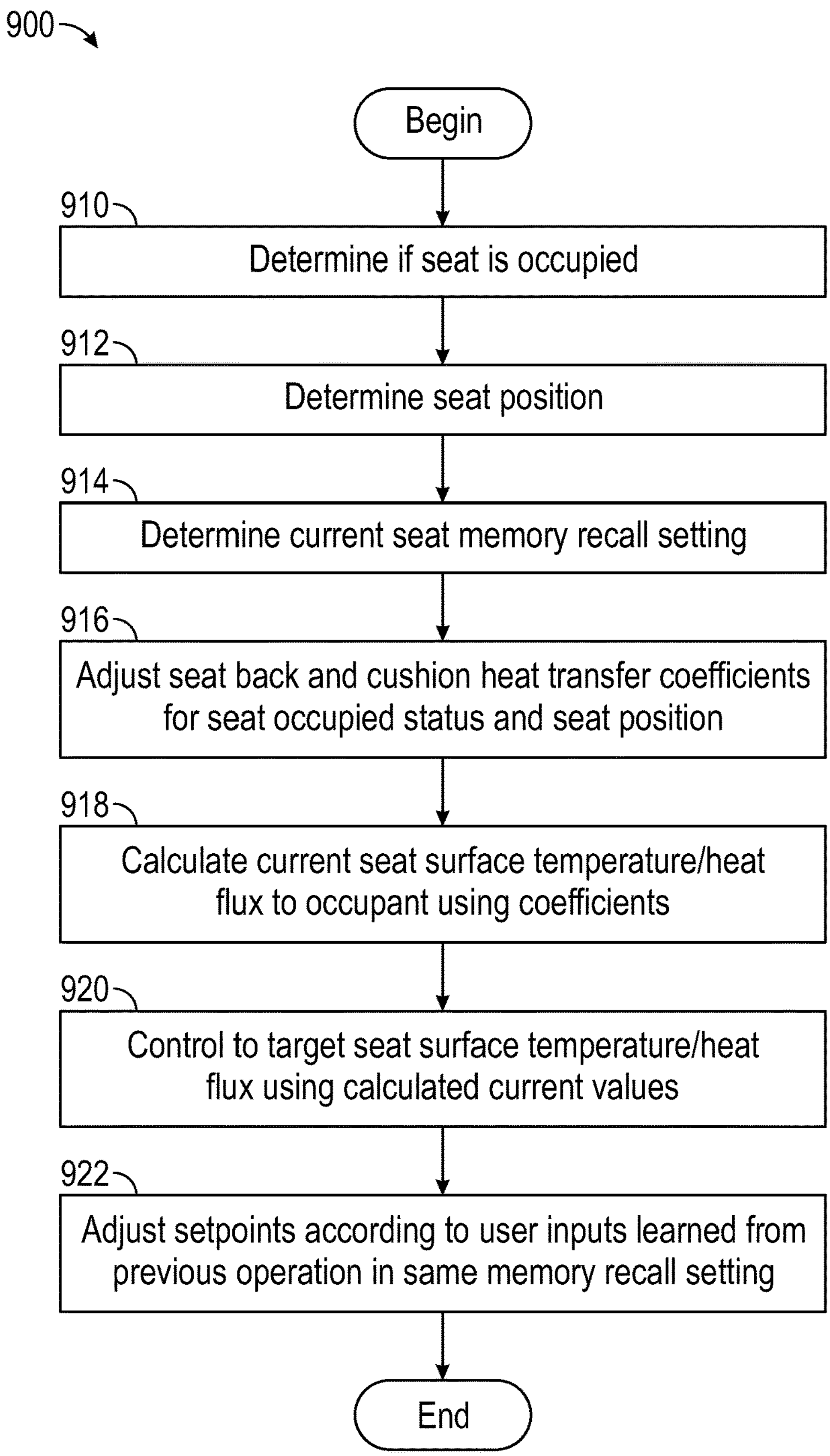
FIG. 9 is a method for optimizing thermal operations in the microclimate system.

In one example method 900 of controlling the system, the controller determines if the seat is occupied (block 910 in FIG. 9). The seat position is determined (block 912), which can be compared against a stored seat position (block 914) to determine whether the current seat position is associated with a known occupant. If needed, the heat transfer coefficient in the heat transfer function can be adjusted based upon the occupant and the seat positioning (block 916). Using the newly adjusted heat transfer coefficients, the current seating surface temperature and/or heat flux can be calculated (block 918) to control the microclimate devices to the desired temperature and/or heat flux (block 920). The setpoints for the microclimate devices may be adjusted due to occupant's inputs from prior operation in the same seat position (block 922).

The disclosed control system reduces the effort needed to incorporate the system into different vehicles and to maintain a customer expected behavior across different seat types without configuration for each seat. Just the thermodynamic characteristics need to change. Since thermodynamic effects can be measured, it is easier to measure specific effected thermal characteristics, adjust models and test than it is to recalibrate the whole system for each seat.

The controller can be used to implement the various functionality disclosed in this application. The controller may include one or more discrete units. Moreover, a portion of the controller may be provided in the vehicle, while another portion of the controller may be located elsewhere. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The controller can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/0 interface(s) may include input devices, for example but not limited to, a keyboard, mouse, scanner, microphone, camera, mobile device, proximity device, etc. Further, the output devices, for example but not limited to, a display, macroclimate device, microclimate device, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method for optimizing thermal operations in a microclimate system comprising:

- providing setpoints of at least one of a microclimate thermal effector for at least one of a seat back and a seat cushion;
- determining whether a seat is occupied by an occupant;
- determining a seat positioning of the seat; and
- adjusting at least one of a seat back heat transfer coefficient and a seat cushion heat transfer coefficient for the microclimate thermal effector, the adjusting based upon the seat occupied determining step and the seat positioning determining step;
- calculating at least one of a seat surface temperature and a heat flux for at least one of the seat back and the seat cushion using the at least one of a seat back heat transfer coefficient and the seat cushion heat transfer coefficient:
- controlling the microclimate thermal effector to achieve the at least one of the seat surface temperature and the heat flux using to provide thermal comfort to an occupant of the seat.

2. The method of claim 1, comprising adjusting a transfer function to account for pressure exerted on seating surfaces of the seat by the occupant based upon the seat occupied determining step and the seat positioning determining step.

3. The method of claim 2, wherein the seat positioning includes at least one of a seat cushion location, a seat back location and a seat lumbar orientation.

4. The method of claim 3, wherein the seat cushion location and seat back location each include at least one of seating surface height and seating surface angle.

5. The method of claim 3, wherein the seat lumbar orientation includes at least one of lumbar support position and size.

6. The method of claim 2, comprising referencing a seat position memory, and the controlling step is performed based upon stored occupant thermal control settings for the occupant associated with the seat position memory.

7. The method of claim 6, comprising preconditioning the seat based upon an adjusted transfer function for the occupant when the seat is unoccupied to achieve a desired occupant thermal comfort.

8. The method of claim 6, comprising revising the stored occupant thermal control settings based upon inputs from the occupant.

9. The method of claim 2, comprising preconditioning the seat when unoccupied based upon an adjusted transfer function for the occupant when unknown to achieve a desired occupant thermal comfort for the unknown occupant, wherein the seat is a passenger seat.

10. A microclimate system for a vehicle occupant comprising:

a seat configured provide an interface between an occupant and a seating surface;

an actuator configured to adjust a seat positioning that characterizes the interface;

at least one microclimate thermal effector in thermal communication with the seat at the interface; and a controller in communication with the at least one microclimate thermal effector, the controller configured to regulate the at least one microclimate thermal effector based upon the interface, the controller performing the method according to claim 1.

11. The microclimate system of claim 10, wherein the controller is configured to regulate the at least one microclimate thermal effector using a transfer function based upon effects of the occupant on the interface.

12. The microclimate system of claim 11, wherein the seating surface is provided by the at least one of the seat cushion and the seat back, and the actuator is configured to adjust for effects on the interface provided by at least one of a seat cushion location, a seat back location and a seat lumbar orientation.

13. The microclimate system of claim 12, wherein the seat cushion location and seat back location each include at least one of seating surface height and seating surface angle and the seat lumbar orientation includes at least one of lumbar support position and size.

14. The microclimate system of claim 11, comprising a seat position input, and the controller includes a first memory having a stored seat position and a second memory having stored occupant thermal conditioning preferences for the transfer function of the at least one microclimate thermal effectors in the stored seat position.

15. The microclimate system of claim 14, wherein the controller has a third memory having occupant information relating to the interface, the occupant information including at least one of occupant height, occupant weight and occupant gender.

16. The microclimate system of claim 11, wherein the seat includes an occupant sensor.

17. The microclimate system of claim 16, wherein the occupant sensor is an occupant weight sensor.

18. The microclimate system of claim 16, wherein the controller is configured to adjust the transfer function based upon an occupant seating status.

19. The microclimate system of claim 11, wherein the transfer function includes characteristics relating to seat material thickness and seating surface area.

20. The microclimate system of claim 11, wherein the transfer function includes characteristics relating to seat thermal conductivity and seat heat transfer rate.

21. The microclimate system of claim 10, wherein the at least one microclimate thermal effector includes at least one of a thermoelectric device, a blower, and a heating mat.

* * * * *